(12) United States Patent
Tsirkin

(10) Patent No.: US 10,102,022 B2
(45) Date of Patent: Oct. 16, 2018

(54) SYSTEM AND METHOD FOR CONFIGURING A VIRTUAL DEVICE

(71) Applicant: Red Hat Israel, Ltd., Raanana (IL)

(72) Inventor: Michael Tsirkin, Raanana (IL)

(73) Assignee: RED HAT ISRAEL, LTD., Raanana (IL)

(*) Notice: Subject to any disclaimer, the term of this patent is extended or adjusted under 35 U.S.C. 154(b) by 116 days.

(21) Appl. No.: 15/161,572

(22) Filed: May 23, 2016

(65) Prior Publication Data

US 2017/0337073 A1    Nov. 23, 2017

(51) Int. Cl.
*G06F 9/455* (2018.01)
*G06F 13/10* (2006.01)

(52) U.S. Cl.
CPC ........ *G06F 9/45558* (2013.01); *G06F 13/102* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 6,820,164 B2 | 11/2004 | Holm et al. | |
| 6,973,510 B2 | 12/2005 | Arndt et al. | |
| 8,028,105 B2 | 9/2011 | Arndt et al. | |
| 8,713,295 B2 | 4/2014 | Bax et al. | |
| 2011/0321158 A1 | 12/2011 | Craddock et al. | |
| 2013/0155083 A1* | 6/2013 | McKenzie | G06T 1/20 345/522 |
| 2014/0164730 A1* | 6/2014 | Gold | G06F 3/0608 711/171 |
| 2014/0173600 A1 | 6/2014 | Ramakrishnan | |
| 2014/0245291 A1 | 8/2014 | Tsirkin et al. | |
| 2015/0040124 A1* | 2/2015 | Tsirkin | G06F 9/4555 718/1 |
| 2015/0254088 A1 | 9/2015 | Chou et al. | |

OTHER PUBLICATIONS

Harriman ("Enhanced Allocation (EA) for Memory and I/O Resources", Oct. 23, 2014 hereinafter "Harriman").*
Lars Bjorlykke Kristiansen "PCIe Device Lending" Department of Informatics, University of Oslo, https://www.duo.uio.no/bitstream/handle/10852/44802/larsbk-pcie-device-lending.pdf, May 11, 2015, 96 pages.
Amit Shah et al. "Virtual I/O Device (VIRTIO) Version 1.0" http://docs.oasis-open.org/virtio/virtio/v1.0/virtio-v1.0.html, Oct. 29, 2015, 77 pages.

* cited by examiner

*Primary Examiner* — Farley Abad
*Assistant Examiner* — Dayton Lewis-Taylor
(74) *Attorney, Agent, or Firm* — Haynes and Boone, LLP

(57) ABSTRACT

Methods, systems, and computer program products are included for providing a virtual machine guest with access to a host device. A method includes providing a hypervisor with access to an enhanced allocation capability entry of a host device. The host device performs input and output operations via a range of addresses that are provided by the enhanced allocation capability entry. The hypervisor runs a virtual machine and configures the virtual machine to include a virtual device corresponding to the host device. The virtual device includes the range of addresses in an enhanced allocation capability entry. The hypervisor modifies a context, such as a bit map, corresponding to the virtual machine to provide guests of the virtual machine with access to perform I/O operations corresponding to the host device using the range of addresses.

20 Claims, 5 Drawing Sheets

SYSTEM AND METHOD FOR CONFIGURING A VIRTUAL DEVICE

FIELD OF DISCLOSURE

The present disclosure generally relates to electrical computers and digital data processing, and more particularly to virtual machine performance of input/output (I/O) operations corresponding to host peripheral devices.

BACKGROUND

A virtual machine is software that is executed on hardware to create a virtualization of a physical computer system. Virtual machines may function as self-contained platforms that run their own operating systems and software applications.

A host machine, such as a server computer, may concurrently run one or more virtual machines using software that is referred to as a hypervisor. The hypervisor allocates a certain amount of the host machine's resources, such as the host machine's underlying physical processors and memory devices, to each of the virtual machines. This allocating by the hypervisor allows the virtual machines to transparently access the host machine's resources. Each virtual machine may use the allocated resources to execute applications, including operating systems referred to as guest operating systems. These guest operating systems may be accessed by one or more local or remote clients to perform computing tasks. In some instances, virtual machines and guest operating systems may be implemented to provide cloud computing environments.

Turning now to the conventional host machines that run the virtual machines, the host machines often include a local Peripheral Component Interconnect (PCI) bus for attaching peripheral hardware devices. For compatibility purposes, these peripheral hardware devices that are attached via the PCI bus may implement PCI-related standards such as conventional PCI, PCI-X (PCI EXTENDED), PCI EXPRESS, and so forth.

Figure 1:
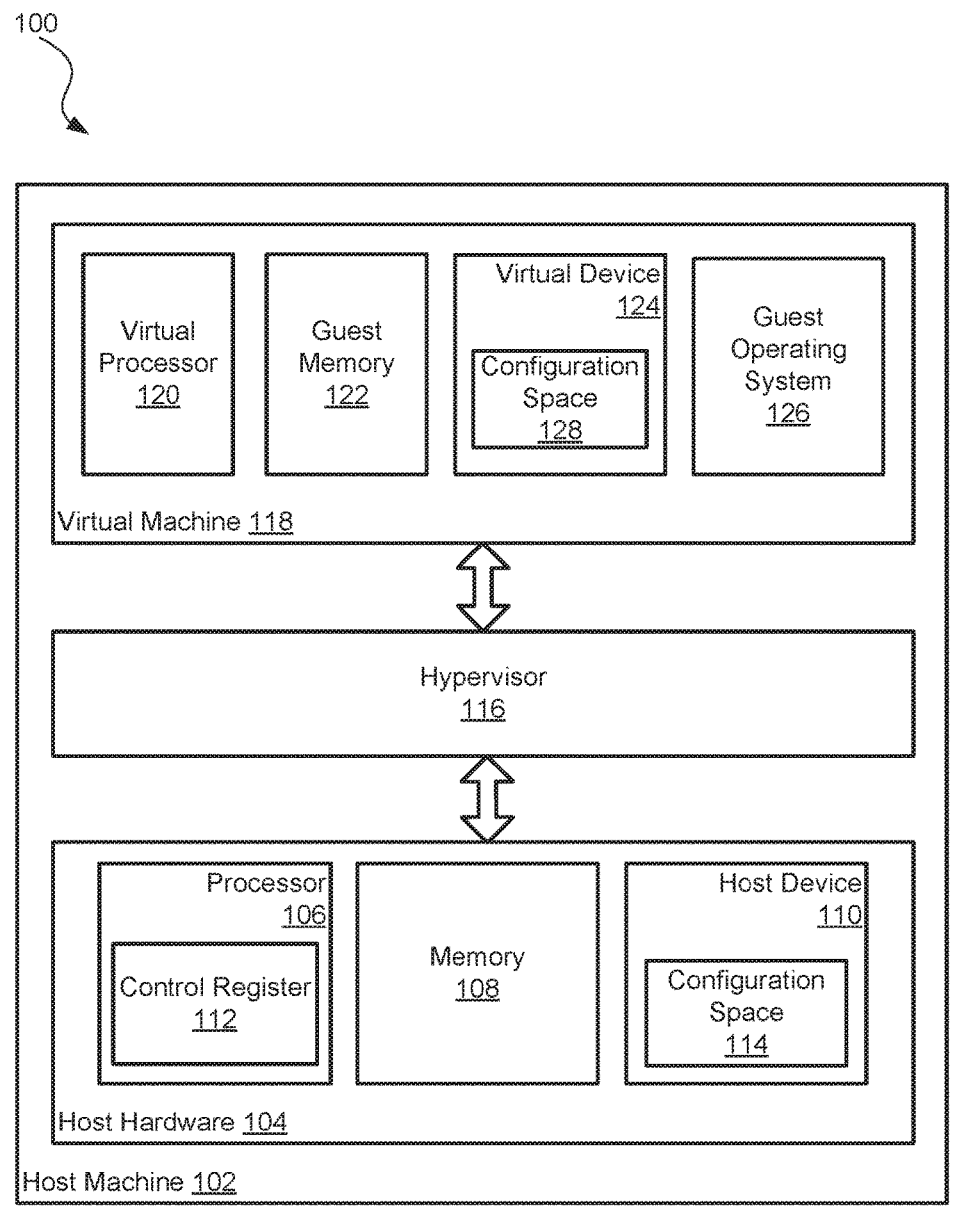
FIG. 1 is an organizational diagram illustrating a system that provides virtual machine guests with access to one or more host devices, in accordance with various examples of the present disclosure.

Embodiments of the present disclosure and their advantages are best understood by referring to the detailed description that follows.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Various examples described herein provide one or more virtual machines that provide access to one or more host devices that are communicatively coupled to a host machine. As discussed herein, the one or more host devices may include a PCI Enhanced Allocation (EA) capability. This PCI EA capability allows the host devices to specify I/O port address ranges to a host machine so that the host machine may access the host devices via addresses within the specified I/O port address ranges. Traditional virtual machines, however, do not support PCI EA capabilities. Thus, even for host devices that include a PCI EA capability, traditional virtual machines are unable to provide access to the host devices using the specified I/O port address ranges without first exiting to the hypervisor. Conventional virtual machines trigger a virtual machine (VM) exit to the hypervisor so that the hypervisor may perform the host device I/O operations on behalf of the conventional virtual machines. Performing a VM exit consumes processing resources.

Various examples described herein provide techniques for configuring virtual devices that include a PCI EA capability, such that the guests of the virtual machines may access the host devices via the virtual devices without triggering VM exits. To configure the virtual devices, the hypervisor exposes the host device to the virtual machine to provide the virtual machine with a range of I/O port addresses corresponding to the host device. The range of I/O port addresses is configured in an EA capability entry in a configuration space of a virtual device on the virtual machine. The hypervisor configures a bit map or other data structure to specify that the virtual machine's access of addresses within the range of I/O port addresses will not trigger a VM exit. Accordingly, guests of the virtual machine may then perform I/O operations by directly accessing (without a VM exit) the I/O port addresses within the range of I/O port addresses.

Additionally, the hypervisor may identify legacy virtual machines that do not support a PCI EA capability. For these legacy virtual machines, the hypervisor may configure a bit map or other data structure to specify that guest access of I/O port addresses within the range of I/O port addresses will trigger a VM exit. Accordingly, responsive to the VM exit, the hypervisor may perform I/O operations with respect to the host devices on behalf of the legacy virtual machines.

These techniques are beneficial and advantageous for enabling virtual machines to access host devices in a more direct manner, which allows for efficiency and performance gains. For example, processing operations for transitioning between the virtual machine and a hypervisor may be avoided by allowing a virtual machine to perform I/O operations without causing a VM exit. This allows the I/O operations to be performed without the overhead of the processing operations to transition between a virtual machine and a hypervisor. Accordingly, a processor of the host machine may execute fewer instructions to perform the I/O operations and therefore perform the I/O operations more quickly and efficiently. Of course, it is understood that these features and advantages are shared among the various examples herein and that no one feature or advantage is required for any particular embodiment.

FIG. 1 is an organizational diagram illustrating a system 100 that provides virtual machines guests with access to one or more host devices, in accordance with various examples of the present disclosure.

The system 100 includes a host machine 102. The host machine 102 may include a personal computer (PC), tablet PC, rack mount computer, cellular telephone, web appliance, server, network router, switch or bridge, or any machine capable of executing a set of instructions (sequential or otherwise) that specify actions to be taken by that machine. Further, while a single host machine is illustrated, the term "machine" shall also be taken to include any collection of machines that individually or jointly execute a set (or multiple sets) of instructions to perform any one or more of the methodologies discussed herein. For example, a collection of machines may be communicatively coupled via one or more network devices and/or transport media.

The host machine 102 includes host hardware 104. Host hardware 104 includes physical elements such as a processor 106, a memory 108, and a host device 110. While one of each of these elements is illustrated for the purposes of simplicity, in some examples more than one of each of these hardware elements may be included. For example, the host hardware 104 may include a plurality of processors as well as various types of memory and host devices.

In the present example, the processor 106 is structured to include one or more general-purpose processing devices such as a microprocessor, central processing unit, and the like. More particularly, the processor 106 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processor 106 is structured to include one or more special-purpose processing devices such as an application specific integrated circuit (ASIC), a field programmable gate array (FPGA), a digital signal processor (DSP), network processor, or the like. The processor 106 may execute instructions for performing the operations and steps discussed herein.

In some examples, the processor 106 includes a control register 112, which controls behavior corresponding to the processor 106. For example, with respect to the INTEL processor, a model-specific register (MSR) may control behavior of the processor. The control register 112 may include one or more data values, which may be provided in a bit map, such as the bit map that is described in further detail with respect to FIG. 2. In the present example, the control register 112 may define operations that will cause/trigger a virtual machine (VM) exit. For example, when the processor 106 is executing instructions in the context of a virtual machine, the processor 106 may identify an instruction that is defined in the control register 112 as a VM exit trigger. Accordingly, responsive to identifying the instruction, the processor 106 may exit from processing instructions in the context of the virtual machine and transition to processing instructions in the context of the hypervisor 116.

In some examples, the hypervisor 116 is structured to instruct the processor 106 to modify the control register 112 to specify operations that trigger a VM exit. For example, the hypervisor 116 may pass one or more data values to the processor 106 via processor-specific instructions to cause the processor 106 to update the control register 112. In this way, the hypervisor 116 may modify a context to allow a guest of the virtual machine 118 to access specified system resources, such as the host device 110, without causing a VM exit. The hypervisor 116 may also modify the context to cause a transition from the virtual machine 118 to the hypervisor 116 when a guest of the virtual machine 118 attempts to access the specified system resources.

The memory 108 is structured to include at least one computer-readable storage medium on which is stored one or more sets of instructions (e.g., software) embodying any one or more of the methodologies or functions described herein. The memory 108 may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device. Accordingly, it is understood that any of the steps of the methods described herein may be implemented by a computing system using corresponding instructions stored on or in a non-transitory computer readable medium accessible by the computing system.

The host device 110 is structured to include at least one hardware device. In some examples, a hardware device is a peripheral device that is implemented to be compatible with PCI EXPRESS or another PCI-related standard. In the present example, the host device 110 implements a PCI EA capability by providing one or more pre-configured ranges of I/O port addresses that the host device 110 is structured to use for performing I/O operations. In some examples, the host device 110 includes one or more of a network interface card, wireless adapter card, audio/sound card, graphics card, storage adapter, and so forth. The host device 110 may be coupled to a PCI bus of the host machine 102. In other examples, the host device 110 may be integrated directly into a motherboard of the host machine 102, without being coupled to a PCI bus.

The host device 110 is structured to include a configuration space 114 that includes information corresponding to the host device 110. In the present example, the configuration space 114 also includes a base address register (BAR) that includes a bit that is set to indicate that the host device 110 includes an EA capability entry. In some examples, the base address register may specify a base address range corresponding to the host device 110.

In the present example, the configuration space 114 includes an EA capability entry that provides a range of I/O port addresses that may be accessed by programs running on the host machine 102 to perform I/O operations with respect to the host device 110. In the present example, I/O includes at least one input, at least one output, or both input(s) and output(s). Accordingly, the host device 110 may include a PCI EA capability by providing a range of I/O port addresses in the EA capability entry, such that the range of I/O port addresses may be accessed by components of the host machine 102 to perform I/O operations to communicate with the host device 110. In some examples, the EA capability entry is further structured to include a bit that specifies whether the EA capability is enabled and a bit that specifies whether the EA capability entry is writable.

The host hardware 104 elements may be communicatively coupled via one or more buses, such as by coupling the processor 106 and the memory 108 to a system bus, and by coupling the host device 110 to a PCI bus. Accordingly, the host hardware 104 elements may be communicatively coupled with one another within the host machine 102. Additionally, the host hardware 104 may include other hardware elements such as a video display unit (e.g., a liquid crystal display (LCD) monitor), alphanumeric input device (e.g., a keyboard), cursor control device (e.g., a mouse), signal generation device (e.g., a speaker), and so forth.

The host machine 102 includes a hypervisor 116, which also may be referred to as a virtual machine monitor, virtual machine manager, and/or VMM. The hypervisor 116 may include executable instructions that are stored in the memory 108 and executed by the processor 106 to provide one or more virtual machines (e.g., virtual machine 118). In some examples, the hypervisor 116 is run on top of a host operating system. In other examples, the hypervisor 116 is run directly on host hardware 104 without the use of a host operating system.

In the present example, hypervisor 116 is executed to provide a virtual machine 118. In other examples, the hypervisor 116 may include instructions that are executed to provide a plurality of virtual machines. The hypervisor 116 is structured to provide the virtual machine 118 by virtualizing at least a portion of the host hardware 104. The hypervisor 116 may provide the virtual machine 118 by performing a hardware emulation, full virtualization, para-virtualization, and/or operating system-level virtualization corresponding to the host machine 102.

The hypervisor 116 manages system resources, including providing access of components of the virtual machine 118 to the host hardware 104, such as the processor 106, the memory 108, and the host device 110. In the present example, the system resources that are provided to the virtual machine 118 include a virtual processor 120 that is mapped to the processor 106, the guest memory 122 that is mapped to at least a portion of the memory 108, and a virtual device 124 that corresponds to the host device 110.

In the present example, the virtual processor 120 includes one or more processors that may be accessed by processes running on the virtual machine 118 to pass instructions to the processor 106. In the present example, the guest memory 122 includes a portion of the memory 108. The portion of the memory 108 may include one or more ranges of memory addresses that are mapped to one or more ranges of guest memory addresses, such that processes running on the virtual machine 118 may access the memory 108 by accessing the guest memory addresses. The mapping between the guest memory addresses and the memory addresses of the guest memory 108 may be provided by one or more page tables of the hypervisor 116 and/or virtual machine 118.

In the present example, the virtual device 124 is a virtual representation of the host device 110. The hypervisor 116 may expose the host device 110 to the virtual machine 118 to allow virtual firmware of the virtual machine 118 to provide the virtual device 124. The hypervisor 116 may expose the host device 110 by preparing a configuration space of the virtual machine 118 with information corresponding to the host device 110 and/or modifying one or more page tables to map memory addresses of the guest memory 122 to memory addresses configured for use by the host device 110. Upon booting the virtual machine 118, the virtual firmware of the virtual machine 118 may probe the configuration space of the virtual machine 118 to detect information corresponding to the host device 110. Accordingly, the hypervisor 116 and/or programs running on the virtual machine 118 may create a virtual device 124 on the virtual machine 118 that represents the host device 110. The virtual device 124 includes a configuration space 128 that includes information based on the contents of the configuration space 114 of the host device 110.

The information included in the configuration space 128 may include, for example, a base address register that specifies a base address range, a bit in the base address register that identifies whether there is an EA capability entry, an EA capability entry, and one or more I/O port addresses that are specified in the EA capability entry. The one or more I/O port addresses provided by the EA capability entry of the configuration space 128 are structured to be accessed by the guest operating system 126 and/or other guests of the virtual machine 118 to perform I/O operations with respect to the host device 110. Thus, the virtual device 124 may also be structured to implement the PCI EA capability provided by the host device 110.

In the present example, the virtual machine 118 includes a guest operating system 126. The guest operating system 126 may include, for example, REDHAT ENTERPRISE LINUX, FEDORA, WINDOWS, OS X, IOS, ANDROID, or other operating system. In some examples, the virtual machine 118 may be structured to not include any guest operating system or be structured to include a plurality of guest operating systems.

The guest operating system 126 may be built on top of a kernel (e.g., a guest kernel), which provides core computing functionality to the virtual machine 118. For example, a kernel that runs underneath the guest operating system 126 may manage important tasks of the virtual machine 118, such as allocating guest memory 122 to virtual machine processes and/or threads, communicating I/O to and from the virtual device 124, managing a file system, handling interrupts, scheduling and running processes to execute instructions of computing tasks by the virtual processor 120, providing an interface between devices and software applications (e.g., guest applications), and/or providing other computing features.

Figure 2:
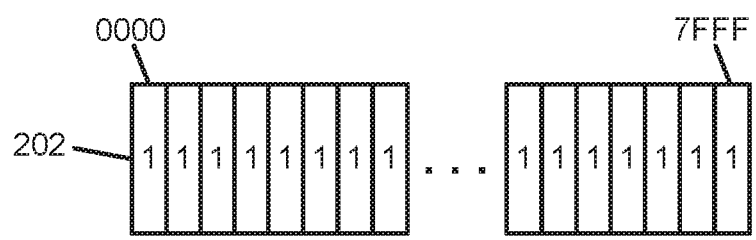
FIG. 2 is an organizational diagram illustrating a context that provides a virtual machine with a plurality of I/O port addresses, in accordance with various examples of the present disclosure.
Figure 2:
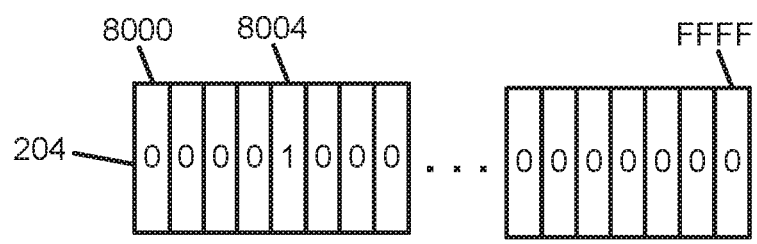

FIG. 2 is an organizational diagram illustrating a context 200 that provides a virtual machine with a plurality of I/O port addresses, in accordance with various examples of the present disclosure. As described with respect to FIG. 1, the context 200 may be provided by a processor. The context 200 may be modified by a processor and/or hypervisor to control processing corresponding to a virtual machine. For example, a hypervisor may modify data values included in the context 200 to configure a processor to either trigger or not trigger a VM exit when a virtual machine attempts to access particular I/O port addresses.

The context 200 may include a data structure, such as a bit map, which specifies data values corresponding to I/O port addresses. While a bit map data structure is described in the present example, the context 200 may also be provided by other data structures instead of or in addition to a bit map. In addition, the processor and/or hypervisor may provide a plurality of contexts that each correspond to a different virtual machine. In other examples, a same context may be provided as the context for multiple virtual machines.

In the present example, the bit map includes a plurality of bits that correspond to I/O port addresses in one or more I/O port address ranges. Further, as illustrated, a bit map may include multiple bit maps. For example, a first bit map 202 included in the context 200 may include bits corresponding to I/O port addresses 0000h (in hexadecimal notation) through 7FFFh. A second bit map 204 in the context 200 may include bits corresponding to addresses 8000h (in hexadecimal notation) through FFFFh.

In the present example, each bit map includes a bit corresponding to each I/O port address in the I/O port address range.

For example:

(1) the I/O port address 0000h is associated by the first bit map 202 with a bit that is configured with a value of 1;

(2) the I/O port address 7FFFh is associated by the first bit map 202 with a bit that is configured with a value of 1;

(3) the I/O port address 8000h is associated by the second bit map 204 with a bit that is configured with a value of 0;

(4) the I/O port address 8004h is associated by the second bit map 204 with a bit that is configured with a value of 1; and (5) the I/O port address FFFFh is associated by the second bit map 204 with a bit that is configured with a value of 0.

The above I/O port addresses and data values are provided merely as examples. In other examples, other I/O port addresses may be provided in addition to those specifically discussed herein, and I/O port addresses may be associated with various other values.

In the present example, the bits that have a value of 0 specify I/O port addresses that will not cause the processor to trigger a VM exit. The bits that have a value of 1 specify I/O port addresses that will cause the processor to trigger a VM exit. Accordingly, for the example bit map values of the context 200 described in (1)-(5), above, a virtual machine that provides an instruction to the processor that references I/O port addresses 0000h, 7FFFh, and 8004h will cause the processor to trigger a VM exit, while a virtual machine that provides an instruction to the processor that references I/O port addresses 8000h or FFFFh will not cause the processor to trigger a VM exit.

Figure 3:
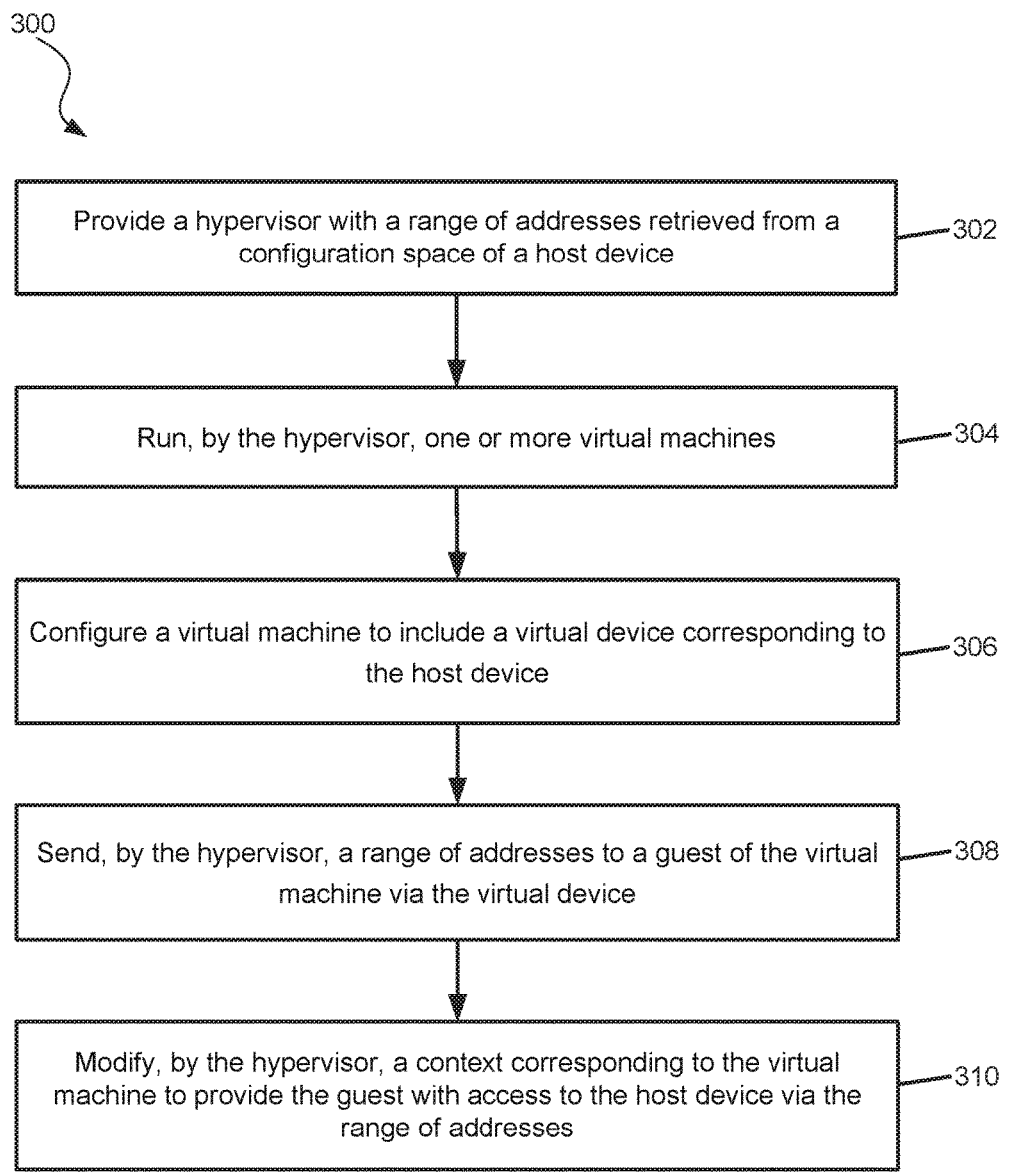
FIG. 3 is a flow diagram illustrating a method for providing a virtual machine with one or more I/O port addresses of a host device, in accordance with various examples of the present disclosure.

FIG. 3 is a flow diagram illustrating a method 300 for providing a virtual machine with one or more I/O port addresses of a host device, in accordance with various examples of the present disclosure. In some examples, the method is performed by the system 100 illustrated in FIG. 1 using the context 200 described in FIG. 2. In some examples, the order of the actions described below may also be performed according to alternative orderings. In yet other examples, additional actions may be added and actions that are described may be removed.

At action 302, a hypervisor is provided with a range of addresses retrieved from a configuration space of a host device. The host machine may provide the hypervisor with access to the host device by physically communicatively coupling the host device to other hardware elements. For example, the host device may be communicatively coupled to a PCI bus or integrated directly with a motherboard of a host machine.

In the present example, the host device is configured with a range I/O port addresses that provide a PCI EA capability corresponding to the host device. In the present example, the range of I/O port addresses is provided in an EA capability entry in a configuration space of the host device. The hypervisor may retrieve these I/O port addresses from the EA capability entry, such that the I/O port addresses are provided to the hypervisor by the configuration space corresponding to the host device.

The configuration space of the host device may include a base address register that includes a range of base addresses. The hypervisor may also be provided with the range of base addresses stored in the base address register.

In some examples, the host machine provides the hypervisor with access to the host device by an operation system of the host machine reading a base address register and an EA capability entry from the configuration space of the host device. The operating system may then provide the hypervisor with a range of base addresses from the base address register and/or the I/O port addresses from the EA capability entry. The other examples, the hypervisor may access the configuration space of the host device without the use of the operating system. Accordingly, the host machine provides the hypervisor with access to the I/O port addresses, such that the hypervisor may enable virtual machine guests to communicate with the host device.

At action 304, the hypervisor runs one or more virtual machines. These virtual machines may include virtualized hardware, such as a virtual processor and guest memory. The hypervisor may run the virtual machines by booting the virtual machines, which execute instructions included in a virtual firmware (e.g., Basic Input/Output System (BIOS) or Extensible Firmware Interface (EFI)), to configure virtual hardware, such as a virtual processor and guest memory.

At action 306, the hypervisor and/or virtual machine firmware configure the virtual machine to include a virtual device corresponding to the host device. During a boot process of the virtual machine, the virtual machine's firmware, kernel, and/or guest operating system may read the information in the configuration space provided by the hypervisor. For example, the virtual machine's firmware may probe/scan the configuration space to identify a base address register that includes a base address range and an EA capability entry that includes one or more I/O port addresses. Based on this base address register and EA capability entry information, the virtual machine firmware may create a virtual device corresponding to the host device and assign the virtual device particular memory addresses in the guest memory and/or I/O port addresses.

The hypervisor may query the configuration space to retrieve the assignments made by the virtual machine firmware. The hypervisor may then prepare one or more Advanced Configuration and Power Interface (ACPI) tables that are stored in the guest memory and that store the assignments corresponding to the virtual device. In some examples, the virtual device information is stored by the hypervisor in a Secondary System Description Table (SSDT) included in the Advanced Configuration and Power Interface (ACPI) tables. Accordingly, the hypervisor configures the virtual machine by exposing host device information to the virtual machine such that a virtual device is able to be configured on the virtual machine. During a boot process of a guest operating system on the virtual machine, the guest operating system may read the ACPI tables prepared by the hypervisor to identify I/O port addresses corresponding to the virtual device that may be accessed to perform I/O with respect to the host device. Accordingly, the virtual device includes a PCI EA capability, such that the I/O port addresses may be accessed on the virtual machine to perform I/O operations with the host device.

At action 308, the hypervisor sends/provides to a guest of the virtual machine the range of addresses through the virtual device. For example, the guest may access the virtual device to retrieve the base address from the base address register of the virtual device and/or the I/O port addresses retrieved from the EA capability entry of the virtual device. In some examples, the hypervisor sends information to the guest of the virtual machine through the virtual device by preparing the configuration space in the guest memory that stores the base address register information and EA capability entry information retrieved from the configuration space of the host device.

At action 310, the hypervisor modifies a context corresponding to the virtual machine to provide the guests of the virtual machine access to the one or more I/O port addresses. In some examples, modifying the context includes the hypervisor instructing a processor to modify a bit map, such as the bit map described with respect to FIG. 2. The hypervisor may modify one or more bits corresponding to the one or more I/O port addresses to clear the bits, thus indicating that the virtual machine's access of the one or more I/O port addresses will not cause a VM exit. In the present example, the bits may be cleared by modifying the values of the bits to 0. Accordingly, guests of the virtual machine may directly perform I/O operations by sending information to the input port addresses in the range of I/O port addresses and/or receiving information from the output port addresses in the range of I/O port addresses.

Figure 4:
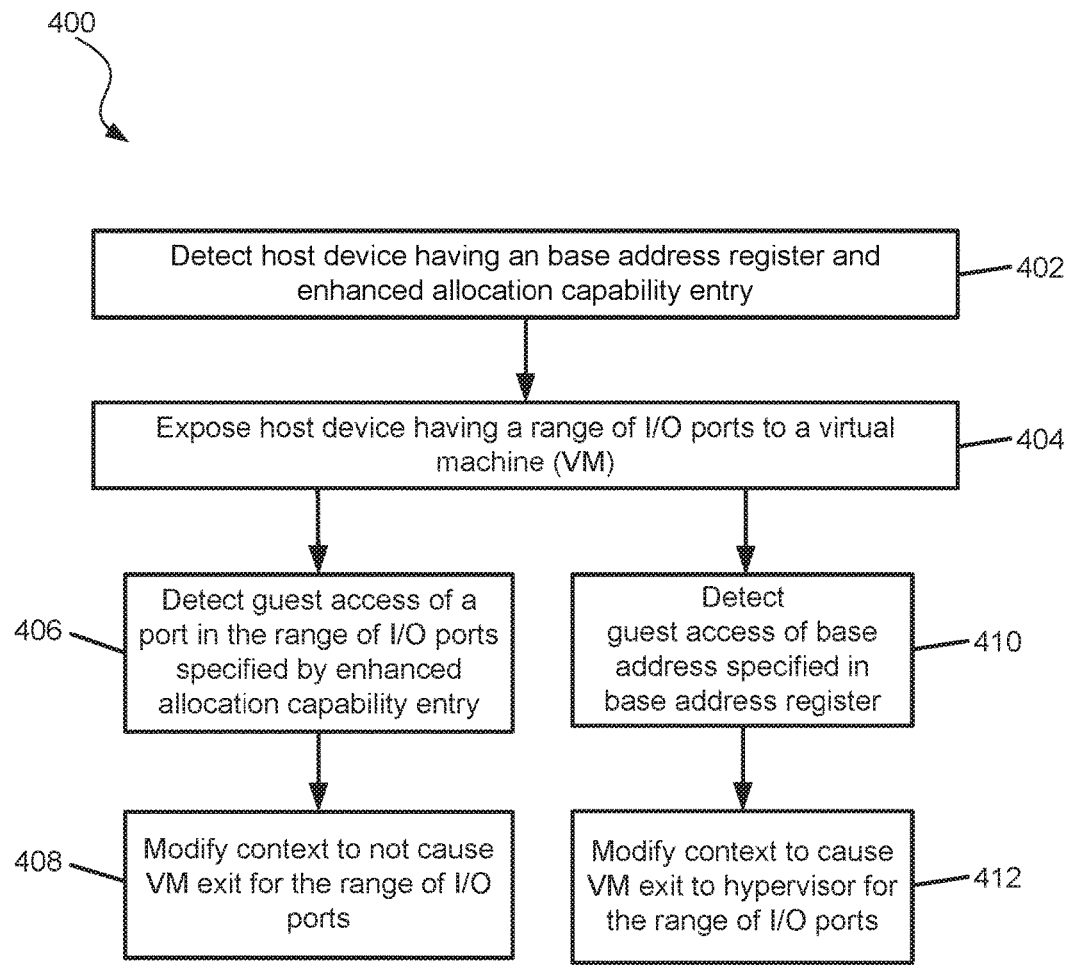
FIG. 4 is a flow diagram illustrating a method for providing a virtual machine with one or more I/O port addresses of a host device, in accordance with various examples of the present disclosure.

FIG. 4 is a flow diagram illustrating a method 400 for providing a virtual machine with one or more I/O port addresses of a host device, in accordance with various examples of the present disclosure. In some examples, the method is performed by the system 100 illustrated in FIG. 1 using the context 200 illustrated in FIG. 2. In some examples, the order of the actions described below may also be performed according to alternative orderings. In yet other examples, additional actions may be added and actions that are described may be removed.

At action 402, a hypervisor detects a host device having a base address register and an EA capability entry. In some examples, the hypervisor reads information provided by an operating system to determine the existence of the host device and access the base address register and EA capability entry of the host device. In other examples, the hypervisor reads the configuration space provided by the host device to identify the base address register and EA capability entry corresponding to the host device. In the present example, the host device is structured with a PCI EA capability entry. The hypervisor may read a bit from the base address register to identify the presence of an EA capability entry, which provides a range of I/O port addresses corresponding to the host device.

At action 404, the hypervisor exposes the host device to the virtual machine. The hypervisor may expose the host device to the virtual machine by providing information from the base address register and EA capability entry to the virtual machine. This information may include a base address range from the base address register and/or a range of I/O port addresses from the EA capability entry. Accordingly, the hypervisor and/or a virtual firmware running on the virtual machine may use this information to configure the virtual machine to include a virtual device corresponding to the host device.

At action 406, the hypervisor detects a guest access of a port in the range of I/O port addresses provided by the EA capability entry of the virtual device. For example, a guest running on the virtual machine may attempt to write data to an I/O port address within the range of I/O port addresses, read data from an I/O port address within the range of I/O port addresses, or perform an operation to enable an I/O port address within the range of I/O port addresses. The attempted access of the I/O port address by the guest of the virtual machine may cause the processor to trigger a VM exit, thus transitioning execution to the hypervisor. The processor may provide the hypervisor with a signal corresponding to the VM exit that notifies the hypervisor regarding the I/O port address that the virtual machine attempted to access. Accordingly, the hypervisor may receive the notification to detect the VM access of the I/O port address.

In some examples, the hypervisor may detect that the EA capability is enabled by reading an enabled bit from an EA capability entry. This bit may be set by the hypervisor and/or virtual machine if the virtual machine is configured with an EA capability.

At action 408, responsive to the detecting the guest access of the port in the range of I/O port addresses or the enabled bit, the hypervisor modifies a context corresponding to the virtual machine so that further accesses of the port addresses within the range of I/O port addresses will not cause a VM exit. The modifying of the context may include the hypervisor clearing bits in a bit map, where each bit corresponds to a port address in the range of I/O port addresses. In the present example, the bits may be cleared by modifying the values of the bits to 0.

At action 410, the hypervisor detects a guest access of a base address within a range of base addresses provided by the base address register of the virtual device. For example, a guest running on the virtual machine may attempt to write data to the virtual device using a base address with the range of base addresses, read data from the virtual device using a base address with the range of base addresses, or perform an operation to enable access to a base address with the range of base addresses. The attempted access of the base address by the guest of the virtual machine may cause the processor to trigger a VM exit, thus transitioning execution to the hypervisor. The processor may provide the hypervisor with a signal corresponding to the VM exit that notifies the hypervisor of the base address that the virtual machine attempted to access. Accordingly, the hypervisor may receive the notification to detect the guest access of the base address specified in the base address register. The guest's attempted access regarding the base address may indicate to the hypervisor that the virtual machine is a legacy virtual machine that does not support direct access to the ports in the range of I/O ports corresponding to the host device.

In some examples, the hypervisor may detect that the EA capability is enabled by reading an enabled bit from an EA capability entry. This bit may be in a cleared state if the virtual machine is not configured with an EA capability.

At action 412, responsive to the detecting of the guest access of the base address or of the cleared enabled bit, the hypervisor modifies a context corresponding to the virtual machine so that guest accesses of the ports in the range of I/O ports will cause a VM exit. The modifying of the context may include the hypervisor setting bits in a bit map, where each bit corresponds to a port in the range of I/O ports. In the present example, the bits may be set by modifying the values of the bits to 1.

Figure 5:
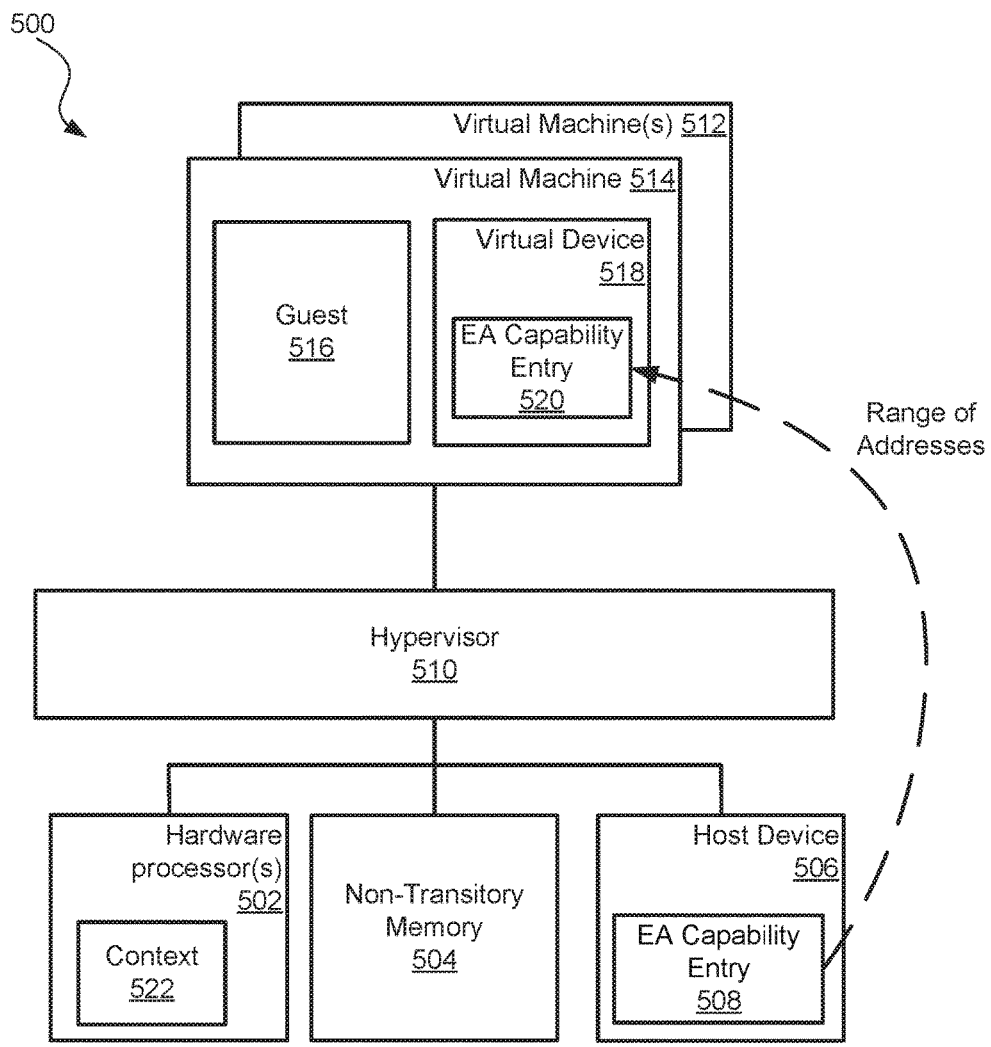
FIG. 5 is an organizational diagram illustrating a system that provides host device I/O access to a guest running on a virtual machine, in accordance with various examples of the present disclosure.

FIG. 5 is an organizational diagram illustrating a system 500 that provides host device I/O access to a guest running on a virtual machine, in accordance with various examples of the present disclosure.

The system 500 includes one or more hardware processor(s) 502, a non-transitory memory 504, and a host device 506. The hardware processor(s) 502 are communicatively coupled to the non-transitory memory 504 to read instructions from the non-transitory memory 504 to cause the system to perform operations for accessing the host device 506.

In the present example, the hardware processor(s) 502 include one or more general-purpose processing devices such as a microprocessor, central processing unit, and the like. The non-transitory memory 504 includes a memory device (e.g., a hard disk drive (HDD) or solid-state drive (SSD)) that stores instructions for execution by the hardware processor(s) 502.

The host device 506 includes a hardware peripheral device, such as a PCI-compatible peripheral device that is coupled to the hardware processor(s) 502 and the non-transitory memory 504 via a PCI bus. The host device 506 includes an enhanced allocation (EA) capability entry 508 that specifies a range of addresses that may be accessed to perform I/O corresponding to the host device 506. The addresses in the range of addresses are structured as a plurality of I/O port addresses.

The system 500 includes a hypervisor 510 that runs one or more virtual machines 512. These virtual machines 512 include a virtual machine 514. The hypervisor 500 retrieves the range of addresses from the EA capability entry 508 of the host device 506 and provides the range of addresses to the virtual machine 514 via a configuration space of the virtual machine 514.

The virtual machine 514 includes a guest 516. The guest 516 may include any program/software/application that is running on the virtual machine 514. For example, the guest 516 may include one or more of a guest operating system, a kernel, a virtual firmware interface (e.g., BIOS or EFI), a user application, or any other program that is running in a memory space assigned to the virtual machine 514 by the hypervisor 510.

The virtual machine 514 includes a virtual device 518 corresponding to the host device 506. The virtual device 518 includes the range of addresses received from the hypervisor 510 and stored in an enhanced allocation capability entry 520 of the virtual device 518.

The hardware processor(s) 502 provides a context 522 corresponding to virtual machines (e.g., virtual machine(s) 512 and virtual machine 514). The context 522 includes a data structure that stores entries corresponding to I/O port addresses. In the present example, the data structure is a bit map and each bit in the bit map corresponds to an I/O port address. The context 522 may be modified by the hypervisor 510 to specify whether guests (e.g., guest 516) accessing the I/O port addresses will trigger a VM exit to the hypervisor 510. The context 522 may default to triggering VM exits when any of the I/O port addresses are accessed from guests running on virtual machines.

After the hypervisor 510 provides the range of addresses to configure the virtual device 518 of the virtual machine 514, the hypervisor 510 modifies the context 522 corresponding to the virtual machine 514. The hypervisor 510 modifies the context 522 to provide the guest 516 with access to the host device 506 via the range of addresses that are stored in the EA capability entry 520 of the virtual device 518. Accordingly, in the present example, the hypervisor 510 instructs the hardware processor(s) 502 to clear a bit in the context 522 corresponding to each address in the range of addresses.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for performing I/O operations corresponding to a peripheral device, the method comprising:
   providing a hypervisor with a range of addresses retrieved from a configuration space of a host device;
   running, by the hypervisor, one or more virtual machines;
   configuring a virtual machine of the one or more virtual machines to include a virtual device corresponding to the host device;
   sending, via the virtual device, the range of addresses to a guest of the virtual machine; and
   modifying, by the hypervisor, a context corresponding to the virtual machine to provide the guest with access to the host device via the range of addresses.

2. The method of claim 1, wherein modifying the context corresponding to the virtual machine comprises:
   clearing one or more bits in a bit map, each bit of the one or more bits corresponding to an address in the range of addresses.

3. The method of claim 1, further comprising:
   accessing, by the guest, the host device via an address in the range of addresses without transitioning execution from the virtual machine to the hypervisor to perform the accessing.

4. The method of claim 1, wherein each address in the range of addresses comprises an I/O port address.

5. The method of claim 1, wherein the range of addresses includes at least two addresses.

6. The method of claim 1, further comprising:
   detecting a guest access of a base address within a base address range that is specified by a base address register of the virtual device; and
   modifying, by the hypervisor, the context corresponding to the virtual machine to cause an exit from the virtual machine to the hypervisor when addresses in the range of addresses are accessed.

7. The method of claim 6, wherein modifying the context corresponding to the virtual machine to cause an exit comprises:
   setting at least one bit in a bit map, each bit of the at least one bit corresponding to an address in the range of addresses.

8. The method of claim 6, wherein the guest access is an attempted read access corresponding to the virtual device, an attempted write access corresponding to the virtual device, or an enabling of access corresponding to the virtual device.

9. The method of claim 1, wherein the virtual device includes the range of addresses in an enhanced allocation capability entry of the virtual device.

10. A non-transitory machine-readable medium having stored thereon machine-readable instructions executable to cause a machine to perform operations comprising:
   providing a hypervisor with a range of addresses retrieved from a configuration space of a host device;
   running, by the hypervisor, one or more virtual machines;
   configuring a virtual machine of the one or more virtual machines to include a virtual device corresponding to the host device;
   sending, via the virtual device, the range of addresses to a guest of the virtual machine; and
   modifying, by the hypervisor, a context corresponding to the virtual machine to provide the guest with access to the host device via the range of addresses.

11. The non-transitory machine-readable medium of claim 10, wherein modifying the context corresponding to the virtual machine comprises:

clearing one or more bits in a bit map, each bit of the one or more bits corresponding to an address in the range of addresses.

12. The non-transitory machine-readable medium of claim 10, the operations further comprising:

accessing, by the guest, the host device via an address in the range of addresses without transitioning execution from the virtual machine to the hypervisor to perform the accessing.

13. The non-transitory machine-readable medium of claim 10, wherein each address in the range of addresses comprises an I/O port address.

14. The non-transitory machine-readable medium of claim 10, wherein the virtual device includes the range of addresses in an enhanced allocation capability entry of the virtual device.

15. The non-transitory machine-readable medium of claim 10, the operations further comprising:

detecting a guest access of a base address within a base address range that is specified by a base address register of the virtual device, wherein the guest access is an attempted read access corresponding to the virtual device, an attempted write access corresponding to the virtual device, or an enabling of access corresponding to the virtual device; and modifying, by the hypervisor, the context corresponding to the virtual machine to cause an exit from the virtual machine to the hypervisor when addresses in the range of addresses are accessed, wherein modifying the context corresponding to the virtual machine to cause an exit comprises setting at least one bit in a bit map, each bit of the at least one bit corresponding to an address in the range of addresses.

16. A system comprising:

a non-transitory memory;

one or more hardware processors coupled to the non-transitory memory that read instructions from the non-transitory memory to cause the system to perform operations comprising:

running, by a hypervisor, one or more virtual machines;

configuring a virtual machine of the one or more virtual machines to include a virtual device corresponding to the host device;

retrieving a range of addresses from an enhanced allocation capability entry of a host device and storing the range of addresses in an enhanced allocation capability entry of the virtual device;

providing the range of addresses to a guest of the virtual machine via the virtual device; and modifying, by the hypervisor, a context corresponding to the virtual machine to provide the guest with access to the host device via the range of addresses.

17. The system of claim 16, wherein modifying the context corresponding to the virtual machine comprises:

clearing one or more bits in a bit map, each bit of the one or more bits corresponding to an address in the range of addresses.

18. The system of claim 16, the operations further comprising:

accessing, by the guest, the host device via an address in the range of addresses without transitioning execution from the virtual machine to the hypervisor to perform the accessing.

19. The system of claim 16, wherein each address in the range of addresses comprises an I/O port address.

20. The system of claim 16, the operations further comprising:

detecting a guest access of a base address within a base address range that is specified by a base address register of the virtual device; and modifying, by the hypervisor, the context corresponding to the virtual machine to cause an exit from the virtual machine to the hypervisor when addresses in the range of addresses are accessed.

* * * * *